US012149019B2

(12) United States Patent
Bobelis et al.

(10) Patent No.: US 12,149,019 B2
(45) Date of Patent: Nov. 19, 2024

(54) PIN AND SLEEVE DEVICE WITH FEATURES TO FACILITATE EASIER ASSEMBLY

(71) Applicant: LEVITON MANUFACTURING CO., INC., Melville, NY (US)

(72) Inventors: Darius Bobelis, Hauppauge, NY (US); Gaurav Surana, Farmingdale, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 711 days.

(21) Appl. No.: 17/285,231

(22) PCT Filed: Oct. 16, 2018

(86) PCT No.: PCT/US2018/055973
§ 371 (c)(1),
(2) Date: Apr. 14, 2021

(87) PCT Pub. No.: WO2020/081052
PCT Pub. Date: Apr. 23, 2020

(65) Prior Publication Data

US 2021/0376517 A1 Dec. 2, 2021

(51) Int. Cl.
*H01R 13/502* (2006.01)
*H01R 24/86* (2011.01)
*H01R 105/00* (2006.01)

(52) U.S. Cl.
CPC ........... *H01R 13/502* (2013.01); *H01R 24/86* (2013.01); *H01R 2105/00* (2013.01)

(58) Field of Classification Search
CPC .. H01R 13/502; H01R 24/86; H01R 2105/00; H01R 24/22; H01R 24/30;
(Continued)

(56) References Cited

U.S. PATENT DOCUMENTS 1,818,290 A 8/1931 Wulle
3,887,256 A 6/1975 Klimek et al.
(Continued)

FOREIGN PATENT DOCUMENTS

GB 249635 A 4/1926
GB 1599306 A 9/1981

OTHER PUBLICATIONS

International Search Report and Written Opinion for International Patent Application No. PCT/US2018/055973 mailed on Dec. 26, 2018, 12 pages.

(Continued)

*Primary Examiner* — Abdullah A Riyami
*Assistant Examiner* — Nader J Alhawamdeh
(74) *Attorney, Agent, or Firm* — KDW Firm PLLC

(57) ABSTRACT

An electrical pin and sleeve device is disclosed. The pin and sleeve device incorporating one or more features to facilitate easier assembly and use. For example, the pin and sleeve device may include one or more alignment or keys between, for example, the electrical contacts and the thru holes for receiving the contacts formed in the device to prevent improper insertion of the contacts within the device. Additionally, and/or alternatively, one or more alignment or keys between components of the pin and sleeve device such as, for example, between the contact carrier and the body member to prevent improper coupling of the body member relative to the contact carrier or subsequent rotation thereof. Additionally, and/or alternatively, the pin and sleeve device may include one or more tapered or funneled surfaces for preventing wire splaying during insertion of the electrical strands into the contacts.

21 Claims, 9 Drawing Sheets

(58) Field of Classification Search
CPC .............. H01R 2201/26; H01R 13/187; H01R 13/645; H01R 13/642
See application file for complete search history.

(56) References Cited

U.S. PATENT DOCUMENTS

| | | | | |
|---|---|---|---|---|
| 4,736,999 | A | 4/1988 | Marks et al. | |
| 5,298,701 | A | 3/1994 | Sandor | |
| 5,449,302 | A * | 9/1995 | Yarbrough | H01R 13/645 439/95 |
| 5,632,655 | A * | 5/1997 | DeMarco, Jr. | H01R 13/434 439/655 |
| 5,741,149 | A | 4/1998 | Anthony | |
| 5,880,420 | A | 3/1999 | Rohmer et al. | |
| 6,302,726 | B1 | 10/2001 | Marechal | |
| 6,956,176 | B2 | 10/2005 | Castaldo | |
| 7,086,892 | B2 * | 8/2006 | Tanacan | H01R 13/7175 439/490 |
| 7,119,292 | B2 | 10/2006 | Castaldo | |
| 8,281,951 | B2 | 10/2012 | Wilson et al. | |
| 9,472,908 | B2 | 10/2016 | Shendge et al. | |
| 9,812,811 | B1 | 11/2017 | Gorin et al. | |
| 9,887,489 | B1 * | 2/2018 | Dietz | H01R 13/193 |
| 2008/0179073 | A1 | 7/2008 | Drane et al. | |
| 2014/0127926 | A1 * | 5/2014 | Condo | H01R 13/6456 439/345 |
| 2021/0167545 | A1 * | 6/2021 | Bobelis | H01R 13/59 |
| 2021/0376517 | A1 * | 12/2021 | Bobelis | H01R 13/645 |

OTHER PUBLICATIONS

International Search Report and Written Opinion for the International Patent Application No. PCT/US19/61364, dated Mar. 19, 2020, 10 pages.

* cited by examiner

PIN AND SLEEVE DEVICE WITH FEATURES TO FACILITATE EASIER ASSEMBLY

This application is a United States National Phase filing of International Application No. PCT/US2018/055973, filed Oct. 16, 2018, which application is incorporated herein by reference in its entirety.

FIELD OF THE DISCLOSURE

The present disclosure relates generally to electrical devices such as pin devices and corresponding sleeve devices, and more particularly to pin devices and sleeve devices incorporating one or more features to facilitate easier assembly and use.

BACKGROUND OF THE DISCLOSURE

Pin and sleeve devices including plugs, connectors, receptacles, inlets, mechanical interlocks, etc. are well known in the art. As used herein, pin devices and sleeve devices will be collectively referred to as pin and sleeve devices. Herein, a single device having either pins (e.g. a plug), sleeves (e.g. a connector), or both pins and sleeves will be referred to as a pin and sleeve device. However, reference to a pin and sleeve device is not intended to mean that any such device has to include both pins and sleeves. Such a device can include one or more pins, one or more sleeves, or both pins and sleeves.

Generally speaking, pin and sleeve devices are often used to supply electrical power in harsh or high abuse environments such as, for example, wet or corrosive environments. Pin and sleeve devices are well-suited to supply electrical power to heavy equipment such as, for example, welders, motors, compressors, conveyors, portable tools, portable lighting, etc. In use, pin and sleeve devices may provide electrical connections safe from dust and water. As such, pin and sleeve devices are designed to provide power connections that are safe and secure from the environment (e.g., moisture, dirt, grime, chemicals, etc.), prevent accidental disconnect under load, and ensure high strength durability. Pin and sleeve devices provide standardized connectors and may be rated at any suitable current and voltage levels. For example, pin and sleeve devices may be rated at current levels of 16A, 20A, 30A, 32A, 60A, 100A, 150A, 200A, 400A, or the like. In addition, pin and sleeve devices may be rated at voltage levels of 125V, 240V, 250V, 480V, 600V, 100/130V, 125/250V, 102/208V, 200/250V, 208/250V, 277/480V, 346-415V, 347/600V, 380/415V, 440-460V, and others. Moreover, pin and sleeve devices may be rated for any suitable electrical phase configuration such as single-phase, three-phase delta, and three-phase wye.

It would be desirable to provide pin and sleeve devices with one or more features to facilitate easier assembly and use.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In one embodiment, disclosed herein is an electrical pin and sleeve device comprising an outer housing, a contact carrier, a body member, and a plurality of electrical contacts. The contact carrier is positioned at least partially within the outer housing, the contact carrier including a plurality of holes. The body member is positioned at least partially within the outer housing and coupled to the contact carrier. The plurality of electrical contacts include a ground contact, a neutral contact, and at least one phase contact, each of the plurality of contacts being positioned within a respective one of the plurality of holes in the contact carrier. Each of the ground contact, the neutral contact, and the at least one phase contact includes a unique key that is different from the key of the other contacts and the plurality of holes each include a complementary unique key configured to receive the respective plurality of electrical contacts.

In one embodiment, each of the keys include one or more chamfer surfaces. For example, in one embodiment, the ground contact includes a first key, the neutral contact includes a second key, and the at least one phase contact includes a third key. The hole for the ground contact includes a fourth key, the hole for the neutral contact includes a fifth key, and the hole for the at least one phase contact includes a sixth key. The first key corresponding to the fourth key so that the ground contact can only be inserted into the hole for the ground contact. The second key corresponding to the fifth key so that the neutral contact can only be inserted into the hole for the neutral contact and the third key corresponding to the sixth key so that the at least one phase contact can only be inserted into the hole for the phase contact.

In one embodiment, one of the first, second or third keys is a first chamfer surface, another one of the first, second or third keys is a first and second chamfer surface, and the other one of the first, second or third keys is a first, second and third chamfer surface, wherein the fourth, fifth and sixth chamfer surfaces formed in the contact carrier correspond to the first, second and third keys, respectively.

In one embodiment, the contact carrier includes an additional key adapted and configured to engage an additional key formed on the body member, the additional key being adapted and configured to prevent the body member from moving relative to the contact carrier after the body member has been coupled to the contact carrier.

In one embodiment, the body member includes a plurality of holes, each of the plurality of holes being sized and configured to receive wire strands from an electrical conductor to be connected to a respective contact of the plurality of electrical contacts, the plurality of holes formed in the body member including a funnel shaped opening arranged and configured to prevent splaying of the wire strands of the electrical conductor during insertion.

In another embodiment, disclosed herein is an electrical pin and sleeve device comprising an outer housing, a contact carrier, a body member, and a plurality of electrical contacts. The contact carrier being positioned at least partially within the outer housing, the contact carrier including a plurality of holes. The body member being positioned at least partially within the outer housing and coupled to the contact carrier. The plurality of electrical contacts including a ground contact, a neutral contact, and at least one phase contact, each of the plurality of contacts being positioned within a respective one of the plurality of holes in the contact carrier. The contact carrier includes a key adapted and configured to engage a key formed on the body member, the key being adapted and configured to prevent the body member from moving relative to the contact carrier after the body member has been coupled to the contact carrier.

In another embodiment, disclosed herein is an electrical pin and sleeve device comprising an outer housing, a contact carrier, a body member, and a plurality of electrical contacts. The contact carrier being positioned within the outer housing, the contact carrier including a plurality of holes. The body member being positioned within the outer housing and coupled to the contact carrier. The plurality of electrical contacts including a ground contact, a neutral contact, and at least one phase contact, each of the plurality of contacts being positioned within a respective one of the plurality of holes in the contact carrier. The body member includes a plurality of holes adapted and configured to enable electrical strands from an electrical conductor to be connected to the plurality of electrical contacts, the plurality of holes formed in the body member including a funnel shaped opening adapted and configured to prevent splaying of the electrical strands during insertion.

BRIEF DESCRIPTION OF THE DRAWINGS

By way of example, a specific embodiment of the disclosed device will now be described, with reference to the accompanying drawings, in which.

Figure 1:
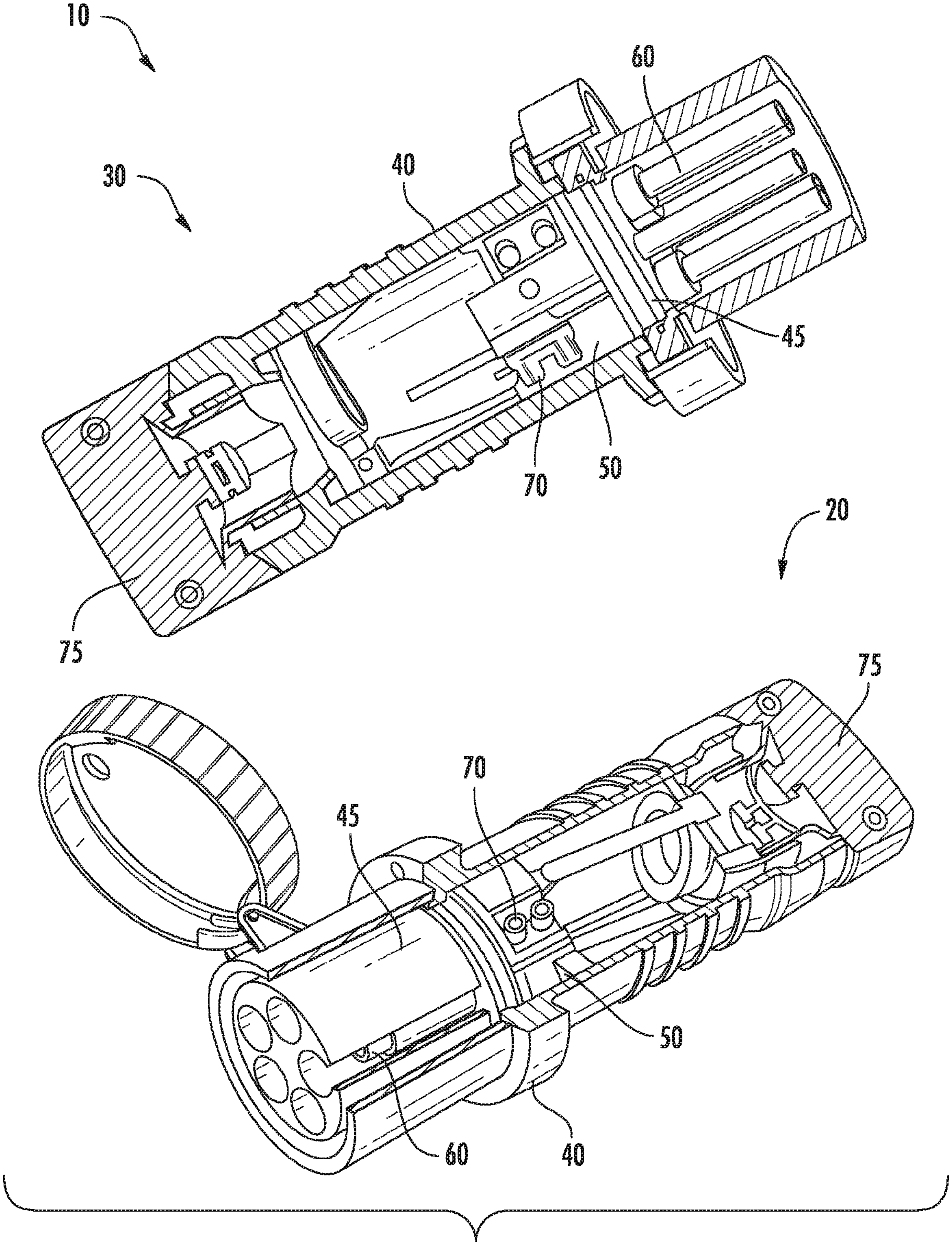
FIG. 1 (PRIOR ART)
FIG. 1 shows cut-away views of known pin and sleeve devices (e.g., a plug and a connector, respectively)

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

DETAILED DESCRIPTION

Numerous embodiments of improved pin and sleeve devices in accordance with the present disclosure will now be described more fully hereinafter with reference to the accompanying drawings, in which preferred embodiments of the present disclosure are presented. As will be described and illustrated, in some embodiments, the electrical pin and sleeve device incorporates one or more features to facilitate easier assembly and use. The pin and sleeve device of the present disclosure may, however, be embodied in many different forms and should not be construed as being limited to the embodiments set forth herein. Rather, these embodiments are provided so that this disclosure will convey certain example aspects of the pin and sleeve device to those skilled in the art. In the drawings, like numbers refer to like elements throughout unless otherwise noted.

As will be described in greater detail below, in various embodiments, a pin and sleeve device according to the present disclosure may include one or more features to facilitate easier assembly and use. That is, for example, according to the present disclosure, an electrical pin and sleeve device may include one or more alignment or keys (e.g., a Poke-Yoke feature) to facilitate easier assembly and/or to prevent human errors caused by improper assembly. For example, in one embodiment, the pin and sleeve device may include one or more alignment or keys between the various types of electrical contacts and the corresponding thru holes formed in the components of the pin and sleeve device such as, for example, the contact carrier of the pin and sleeve device, to prevent improper insertion of the various types of electrical contacts. Additionally, and/or alternatively, one or more alignment or keys may be incorporated between components of the pin and sleeve device such as, for example, between the contact carrier and the body member (e.g., rear housing or cap) of the pin and sleeve device, to prevent improper orientation of the body member relative to the contact carrier. Additionally, and/or alternatively, the pin and sleeve device may include one or more tapered or funneled surfaces formed in, for example, the body member (e.g., rear housing or cap) for preventing, or at least minimizing, splaying of wire strands of an electrical conductor as they are inserted into the recesses formed in the electrical contacts.

As will be described herein, the features according to the present disclosure may be used with any suitable electrical pin and sleeve device now known or hereafter developed. As such, details regarding construction and operation of the electrical pin and sleeve devices are omitted for sake of brevity of the present disclosure. In this regard, the present disclosure should not be limited to the details of the electrical pin and sleeve device disclosed and illustrated herein unless specifically claimed and that any suitable electrical pin and sleeve device can be used in connection with the principles of the present disclosure.

Generally speaking, as will be appreciated by one of ordinary skill in the art, pin and sleeve devices are used to supply power to connected devices. As will be appreciated by one of ordinary skill in the art, pin and sleeve devices may encompass plugs, connectors, receptacles, inlets, mechanical interlocks, etc. These devices will be collectively referred to herein as a pin and sleeve device without the intent to limit.

Referring to FIG. 1, in one embodiment, a connector 20 may be connected to power and a plug 30 may be connected to a downstream electrical device, or vice-versa. In use, the plug 30 may be connected to the connector 20 to supply power to the downstream electrical device. As will be readily appreciated by one of ordinary skill in the art, each of the pin and sleeve devices 10 may include an outer housing 40, a contact carrier 45, a body member 50, and electrical contacts 60. The electrical contacts 60 in the connector 20 may generally be in the form of sleeves while the electrical contacts 60 in the plug 30 may generally be in the form of pins for contacting the sleeves in the connector 20. Sleeves and pins are arranged and configured to electrically contact and mechanically engage with each other. Optionally, each of the pin and sleeve devices 10 may also include one or more terminal screws 70 for securing wire strands of the electrical conductor 15 (FIG. 2) to the contacts 60, a cord clamp 75 for securing the electrical conductor 15 (FIG. 2) to the pin and sleeve device 10, one or more grommets or seals, a cap, etc. Additionally, as will be appreciated by one of ordinary skill in the art, an inlet (not shown) may be used in placed of a plug for coupling to a connector and/or a receptacle may be used in place of a connector for coupling to a plug.

Figure 2:
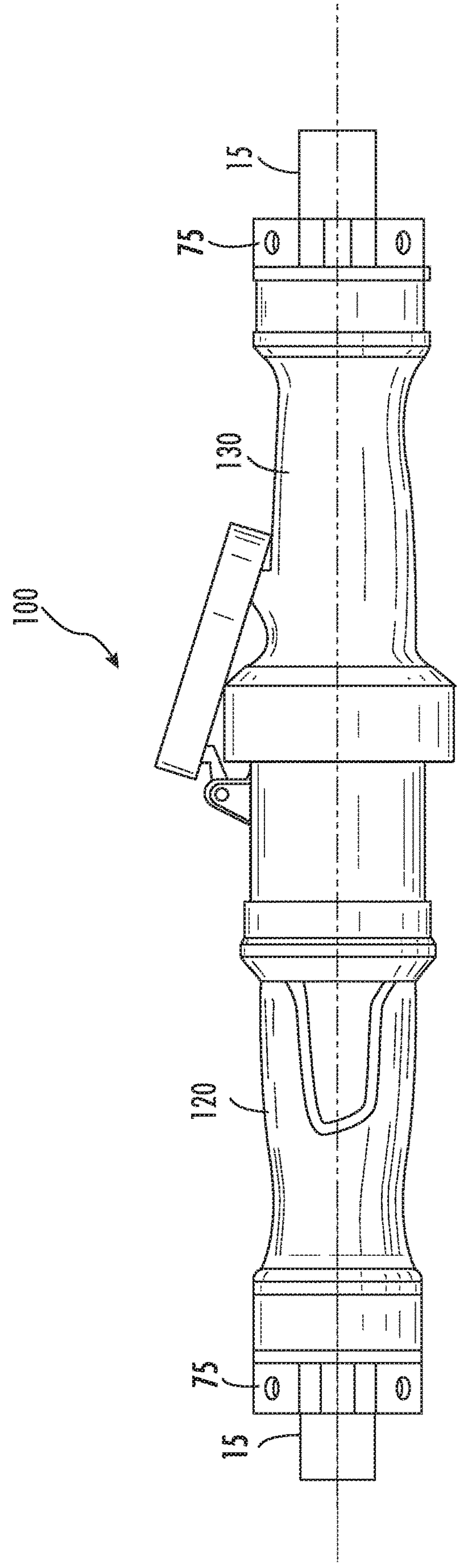
FIG. 2 is a side view of an example embodiment of pin and sleeve devices in accordance with one aspect of the present disclosure, the pin device shown coupled to the sleeve device.

In accordance with one or more various aspects of the present disclosure, referring to FIG. 2, as will be appreciated by one of ordinary skill in the art, a plug 130 may be coupled to a connector 120. As previously mentioned, the connector 120 may be connected to power via electrical conductors of a first electrical cable 15 and the plug 130 may be connected to a downstream electrical device via electrical conductors of a second electrical cable 15. In this manner, power may be supplied to the downstream electrical device.

Figure 3:
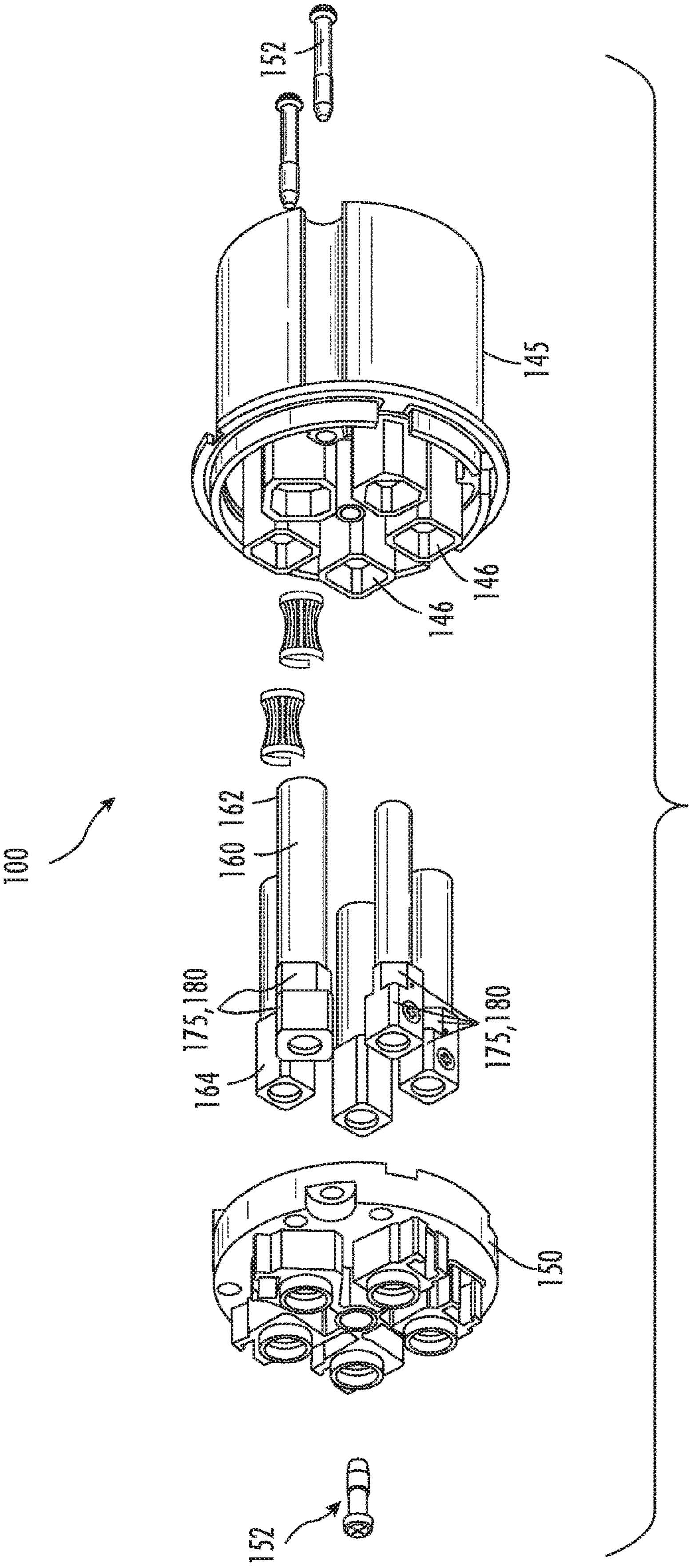
FIG. 3 is an exploded perspective view of an example embodiment of a pin and sleeve device in accordance with one aspect of the present disclosure, the pin and sleeve device including a contact carrier, a body member, and electrical contacts.
Figure 5:
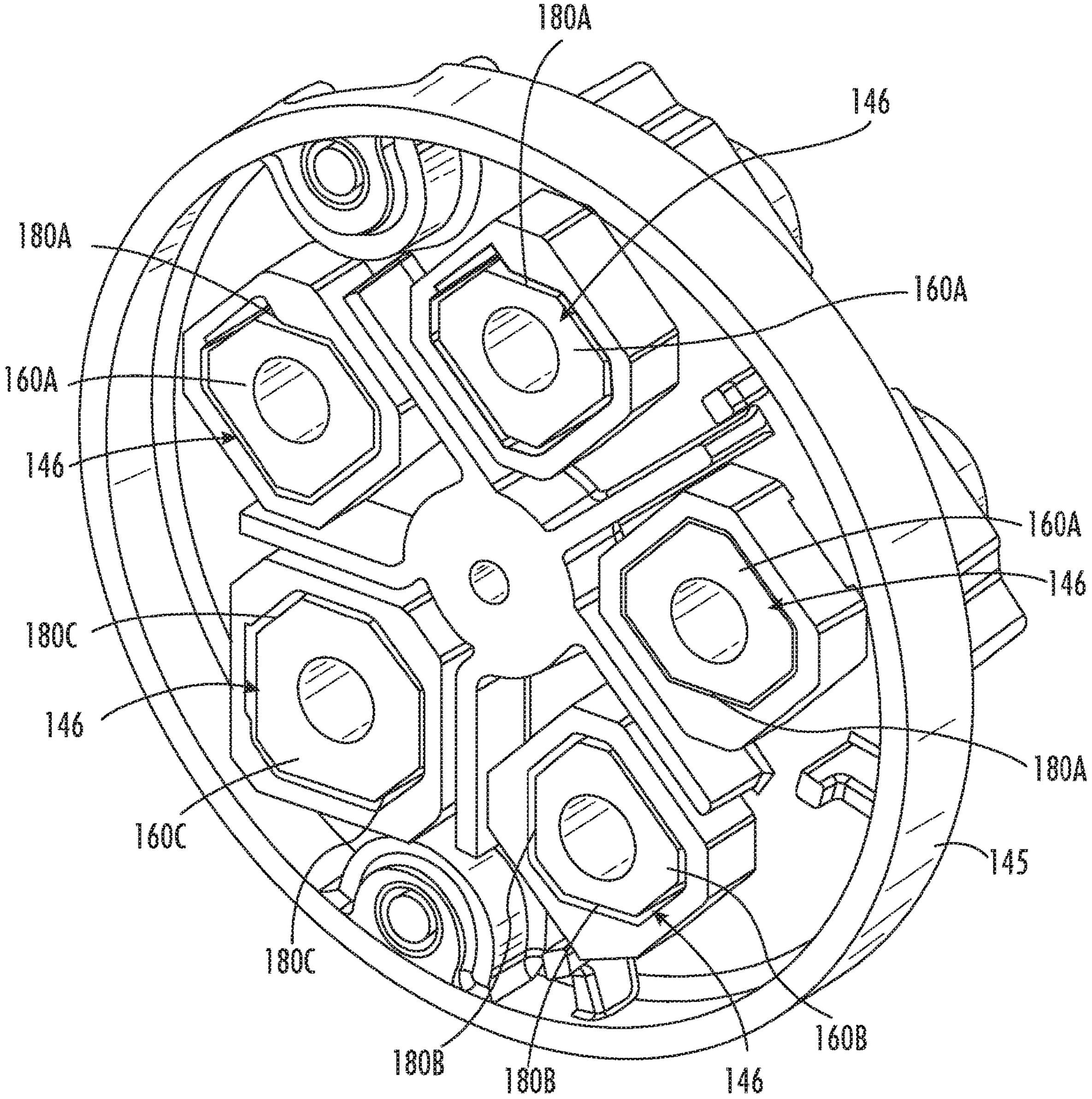
FIG. 5 is an alternate rear perspective view of electrical contacts positioned within a pin and sleeve device in accordance with one aspect of the present disclosure.

Referring to FIG. 3, an exploded, perspective view of an example embodiment of pin and sleeve device 100 is illustrated. As illustrated, the pin and sleeve device 100 may include a contact carrier 145, a body member 150 (e.g., rear housing or cap), and contacts 160 (e.g., sleeves). As will be appreciated by one of ordinary skill in the art, during assembly, the electrical contacts 160 are inserted into corresponding thru holes 146 formed in the contact carrier 145. Thereafter, the body member 150 (e.g., rear housing or cap) is coupled to the contact carrier 145. The body member 150 may be coupled to the contact carrier 145 by any suitable mechanism now known or hereafter developed including, for example, fasteners 152, adhesive, welding, captivity by other elements, etc. It should be understood that while components (e.g., contact carrier 145, body member 150, and contacts 160) of a connector 120 are illustrated and described, the present disclosure is equally applicable to the components (e.g., contact carrier 145, body member 150, and contacts 160) of a plug 130 (as illustrated in FIG. 5).

As will be appreciated by one or ordinary skill in the art, in use, the electrical contacts 160 may include a ground contact, a neutral contact, and one or more phase contacts. In use, the various contacts 160 may appear geometrically similar, for example, the neutral contact and the phase contact may have identical sizes and/or geometries. However, to comply with agency testing requirements and to maintain a safe working condition during use, a specific order of connection and break must be maintained. As a result, during assembly, to ensure proper assembly of the pin and sleeve device 100, the ground contact should only be inserted into the corresponding thru hole for the ground contact, the neutral contact should only be inserted into the corresponding thru hole for the neutral contact, and the phase contact should only be inserted into the corresponding thru hole for the phase contact (e.g., the neutral contact should not be inserted into the corresponding thru hole for the phase contact and so on).

Thus, in accordance with one aspect of the present disclosure, to ensure that contacts 160 of similar geometries cannot be interchanged during assembly (e.g., to ensure that a neutral contact isn't inserted in place of a phase contact, or vice-versa), an alignment, key or keying feature (e.g., a Poke-Yoke mechanism) 175 is incorporated between, for example, the electrical contacts 160 and the thru holes 146 formed in the contact carrier 145 (alignment, key and keying are used interchangeably herein without the intent to limit).

That is, each of the contacts 160 (e.g., the ground contact, the neutral contact, and the phase contact) include a unique key that is different from the key of the other contacts. Similarly, the holes 146 formed in the contact carrier 145 each include a unique key that is different from the key of the other holes. In use, the keys 175 are adapted and configured to ensure that the ground contact, the neutral contact, and the phase contact are insertable only into a corresponding hole 146 in the contact carrier 145. In addition, the unique keys 175 prevent improper insertion or orientation of the contacts 160 into their respective holes 146. In this manner, proper positioning and/or orientation of each respective contact 160 within its respective hole 146 is ensured, and thus ensuring proper positioning, orientation, and/or alignment of the terminal screws 70.

Figure 4:
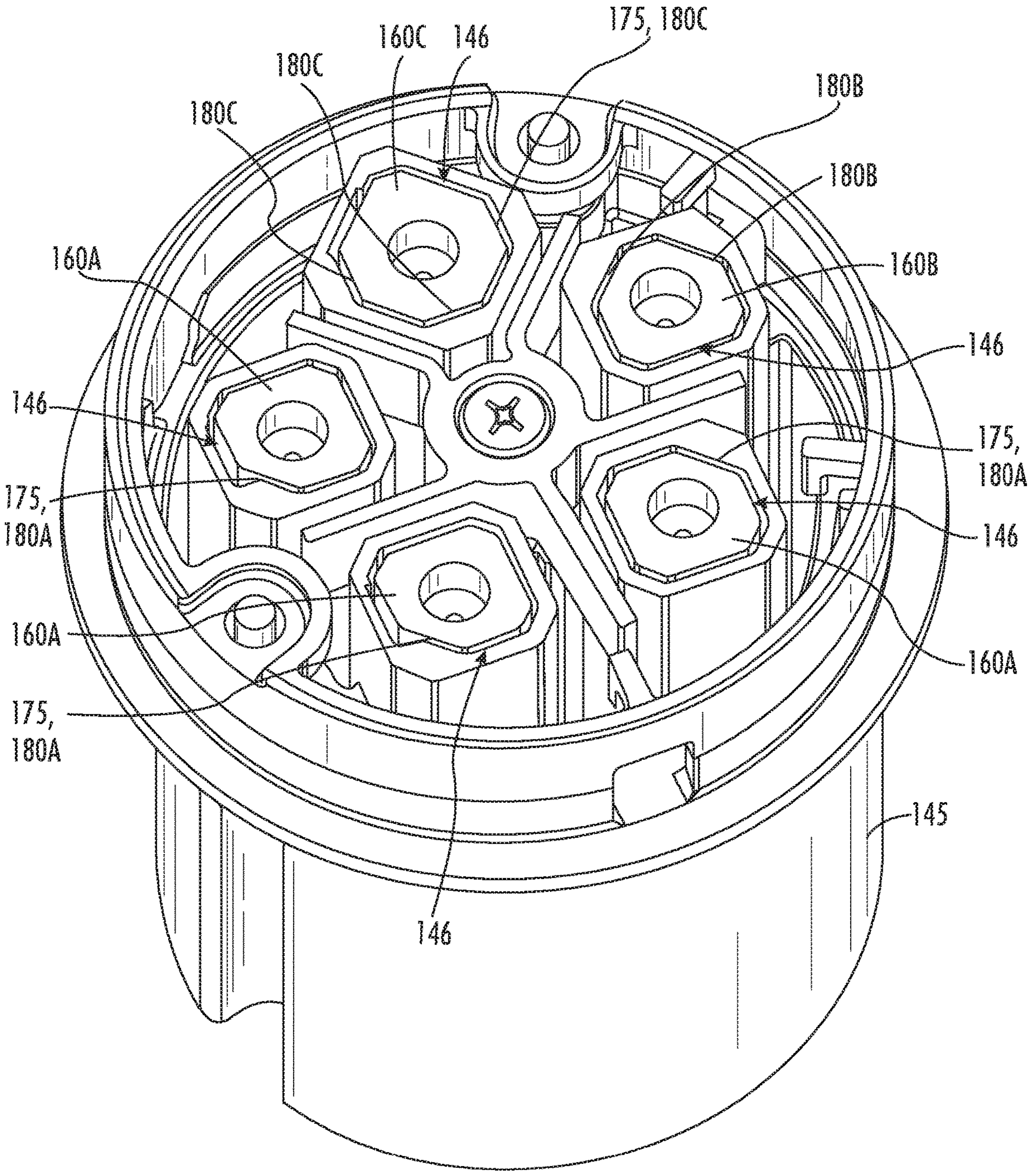
FIG. 4 is a rear perspective view of electrical contacts positioned within a portion of a pin and sleeve device in accordance with one aspect of the present disclosure.

The key 175 may be any suitable mechanism now known or hereafter developed. Referring to FIGS. 3-5, the key 175 may be in the form of one or more chamfer surfaces 180 milled in the electrical contacts 160. That is, as illustrated in FIG. 3, in one example embodiment, the electrical contacts 160 may include a first portion 162 and a second portion 164. The first portion 162 may be generally cylindrical and may be adapted and configured to mate with a corresponding electrical contact in a second pin and sleeve device (e.g., plug). The second portion 164 may be generally non-cylindrical such as, for example, square shaped and may be adapted and configured to mate with the corresponding thru hole 146 formed in the contact carrier 145 so that, in use, the electrical contact 160 is prevented from rotating when positioned within the contact carrier 145. That is, the thru holes 146 may include a correspond or complementary non-cylindrical shape such as, for example, a square shape that corresponds to, and receives, the square shape of the second portions 164 of the associated electrical contact 160. For example, the second portion 164 may include one or more edges, flats, chamfers, or the like to prevent rotation of the contact 160 relative to the contact carrier 145. In addition, the square profile of the second portion 164 of the contact 160 allows a convenient location for the terminal screw 70.

FIG. 4 illustrates an example embodiment of female electrical contacts 160 positioned within a pin and sleeve device 100. FIG. 5 illustrates an example embodiment of portions of male contacts 160 positioned within a pin and sleeve device 100. Referring to FIGS. 4 and 5, in one example embodiment, the various electrical contacts 160 may include various, distinct arrangements of chamfer surfaces 180 (chamfers, flats, or the like are used interchangeably herein without the intent to limit). For example, as illustrated, the phase contact 160A may include a first chamfer surface arrangement 180A that includes a single unique chamfer surface having a unique length, width and/or shape, the neutral contact 160B may include a second chamfer surface arrangement 180B that includes first and second unique chamfer surfaces having a unique length, width and/or shape, and the ground contact 160C may include a third chamfer surface arrangement 180C that includes first, second, and third unique chamfer surfaces having a unique length, width and/or shape. As illustrated, the thru holes 146 formed in the contact carrier 145 include corresponding and/or complementary shapes (e.g., chamfers) for receiving and mating with the respective electrical contact 160. In this manner, during assembly, insertion of an incorrect contact 160 into a thru hole 146 is prevented. That is, for example, if a user were to attempt to insert a neutral contact 160B into a thru hole 146 intended for a phase contact 160A, the neutral contact 160B would not be properly received therein and thus, for example, the contact carrier 145 would not properly receive the body member 150 (e.g., the rear housing or cap cannot be installed if placement of the contacts 160 is incorrect due to an obvious raised height of the electrical contact 160 caused by the electrical contact 160 not being properly positioned or seated within the thru hole 146 formed in the contact carrier 145). As such, an indication of improper assembly would be provided to the assembler.

As should be appreciated, the key 175 may be any suitable mechanism as long as it prevents improper insertion of the contacts 160 into the thru holes 146 formed in the pin and sleeve device 100 (e.g., contact carrier 145). As such, the present disclosure should not be limited to the particular chamfers and/or shapes described and illustrated herein. For example, each type of electrical contact (e.g., ground, neutral, phase) may include any size, shape, feature (e.g., chamfer, relief, etc.) or the like to match a corresponding size, shape or feature formed in the mating receptacle (e.g., thru hole 146) so long as the size, shape, feature of the contact 160 can only be received within the corresponding mating receptacle (e.g., thru hole 146) intended for that contact. For example, it is envisioned that the ground contact may include first, second and third chamfer surface arrangements, the neutral contact may include first and second chamfer surface arrangements, and the phase contact may include a single chamfer surface arrangement. Additionally, and/or alternatively, it is envisioned that the contacts 160 and the thru holes 146 may incorporate alternate shapes or sizes to distinguish between the various contacts. For example, it is envisioned that, for example, the second portion 164 of one of the contacts 160 may be larger or smaller than the second portion 164 of the other contacts 160 so that insertion of the one contact will be prevented or not be received properly within a non-corresponding thru hole. Alternatively, it is envisioned that the contacts 160 may have different shapes (e.g., circular, oval, square, rectangular) so that insertion of one contact will be prevented or not be received properly within a non-corresponding thru hole. Alternatively, it is envisioned that the various contacts 160 may include one or more projections for receipt within a corresponding groove formed in the corresponding thru hole wherein each contact 160 includes separately configured projections so that insertion of one contact will be prevented or not be properly received within a non-corresponding thru hole. As will be appreciated, the available, possible configurations are nearly endless.

The electrical contacts 160 (e.g., male or pin, and female or sleeve) may be integrally formed and/or machined from any suitably conductive material such as, for example, brass.

Figure 6:
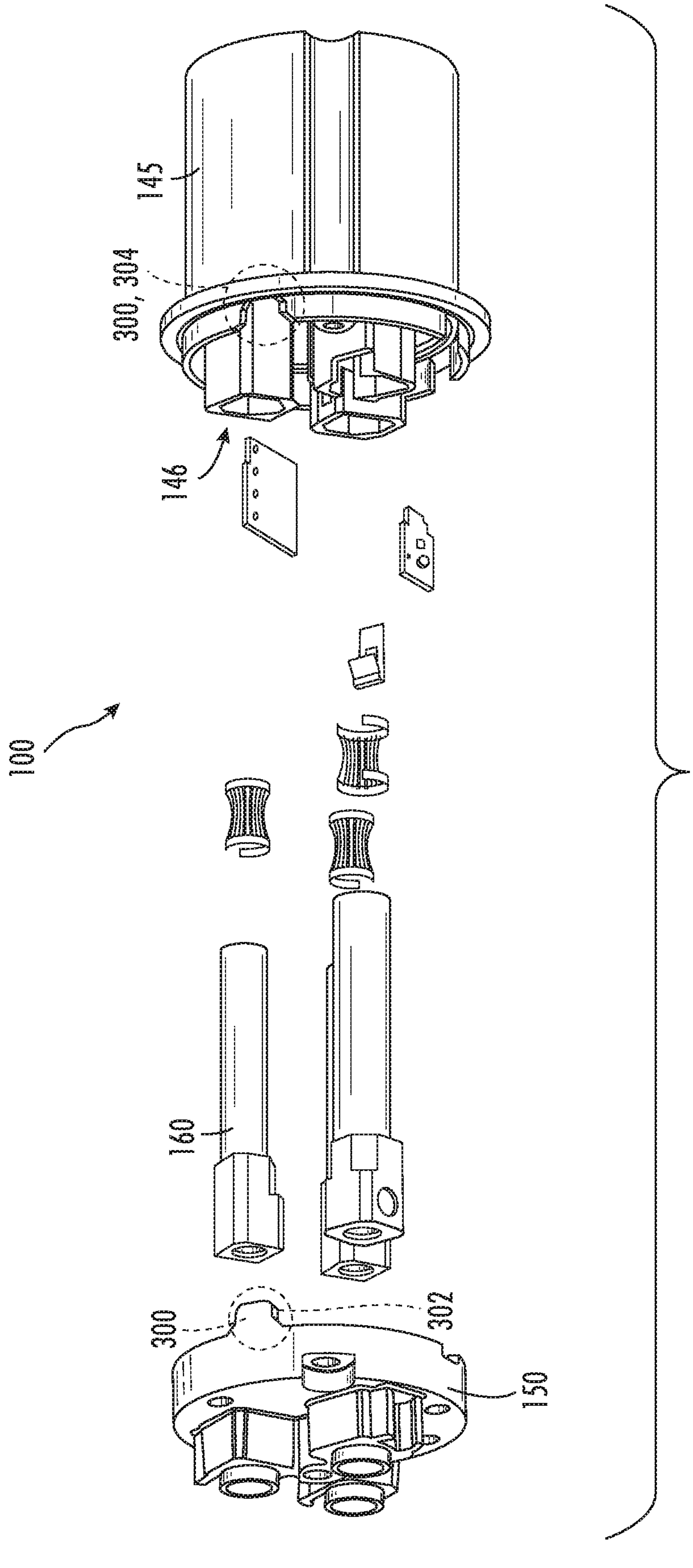
FIG. 6 is an exploded perspective view of an example embodiment of a pin and sleeve device in accordance with one aspect of the present disclosure, the pin and sleeve device including a contact carrier, a body member, and electrical contacts.

Referring to FIG. 6, an exploded, perspective view of an example embodiment of a pin and sleeve device 100 is illustrated. As illustrated, the pin and sleeve device 100 may include a contact carrier 145, a body member 150 (e.g., rear housing or cap), and contacts 160 (e.g., sleeves). As previously mentioned, during assembly, the electrical contacts 160 (e.g., sleeves) are inserted into corresponding thru holes 146 formed in the pin and sleeve device 100 (e.g., contact carrier 145). Thereafter, the body member 150 (e.g., rear housing or cap) is coupled to the contact carrier 145. The body member 150 (e.g., rear housing or cap) may be coupled to the contact carrier 145 by any suitable mechanism now known or hereafter developed including, for example, fasteners, adhesive, welding, press-fit, etc. It should be understood that while components (e.g., contact carrier 145, body member 150, and contacts 160) of a connector 120 are illustrated and described, the present disclosure is equally applicable to the components (e.g., contact carrier 145, body member 150, and contacts 160) of a plug 130.

Also, as previously mentioned, the electrical contacts 160 include a ground contact, a neutral contact, and one or more phase contacts. In use, the various contacts 160 are connected to the respective wire strands of an electrical conductor 15 (FIG. 2). For example, the ground strand or wire is coupled to the ground contact, the neutral strand or wire is coupled to the neutral contact, and the phase strands or wires are coupled to the phase contacts. However, in use, the various contacts 160 may appear geometrically similar, for example, the neutral contact and the phase contact may have identical sizes and/or geometries. As a result, to ensure proper wiring, the body member 150 (e.g., rear housing or cap) may include markings for identifying the location of the ground, neutral, and phase contacts 160.

Figure 7:
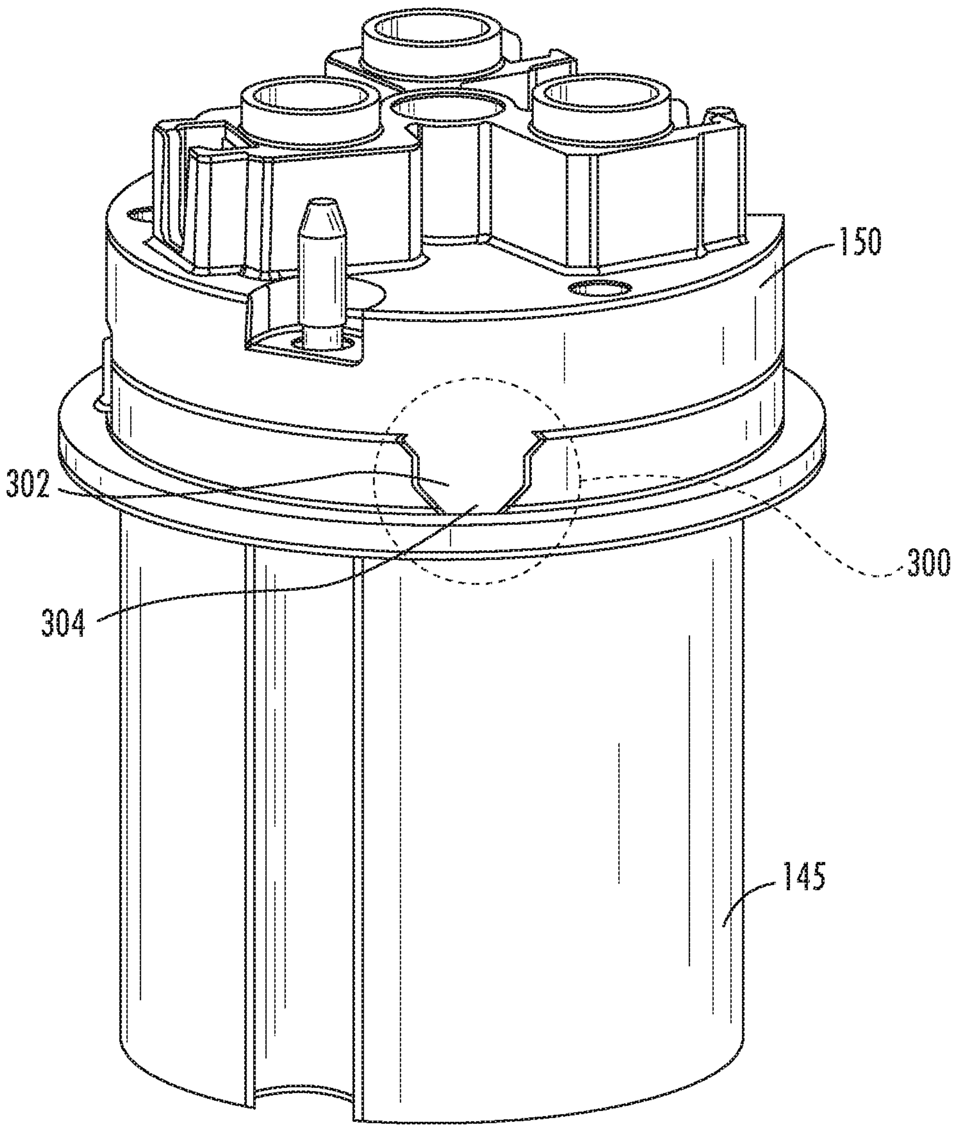
FIG. 7 is a perspective view of the pin and sleeve device shown in FIG. 6, the pin and sleeve device shown with the body member coupled to the contact carrier.

Thus, referring to FIGS. 6 and 7, in accordance with one aspect of the present disclosure, to ensure that the body member 150 (e.g., rear housing or cap) is properly coupled to, positioned and aligned with respect to the contact carrier 145 (e.g., to ensure that the body member 150 (e.g., rear housing or cap) isn't improperly rotated or coupled to the contact carrier 145), a key 300 is incorporated between, for example, the contact carrier 145 and the body member 150 (e.g., rear housing or cap). In this manner, the key 300 ensures proper alignment of the contact carrier 145 and the body member 150 (e.g., rear housing or cap) so that the markings on the body member 150 (e.g., rear housing or cap) correspond to the proper locations of the phase, neutral and ground contacts. Additionally, the key 300 ensures that the proper body member 150 is coupled to the contact carrier 145 as different configurations of contact carriers 145 and body members 150 may have different alignment/keys.

The key 300 may be any suitable mechanism now known or hereafter developed. For example, as illustrated, the key 300 may be in the form of one or more projections 302 associated with and extending from the body member 150 and one or more corresponding recesses 304 formed in the contact carrier 145. Alternatively, the one or more projections 302 may be associated with and extend from the contact carrier 145 and one or more corresponding recesses 304 may be formed in the body member 150.

In this manner, during assembly, proper keying of the body member 150 and the contact carrier 145 is ensured when the projections 302 are received within the recesses 304, and improper keying of the body member 150 to the contact carrier 145 is prevented. Additionally, during transportation and use (e.g., subsequent to assembly), rotation of the body member 150 relative to the contact carrier 145 is prevented (again, owing to the interaction between the projections 302 and recesses 304) so that the proper positioning of the body member 150 relative to the contact carrier 145 is ensured and hence the proper positioning of the markings or identification on the body member 150. That is, by incorporating a projection or male key into one of the contact carrier 145 and body member 150 along with a corresponding recess, slot, or female component in the other of the contact carrier 145 and body member 150, the contact carrier 145 and the body member 150 can only be engaged in a single and proper orientation ensuring that the markings on the body member 150 are properly positioned relative to the contacts 160 positioned in the contact carrier 145 thereby preserving the integrity of the wiring instructions located on the body member 150.

As should be appreciated, the key 300 may be any suitable mechanism or keying feature now known or hereafter developed so long as improper coupling of the body member 150 to the contact carrier 145 is prevented. As such, the present disclosure should not be limited to the particular projections and recesses described and illustrated herein unless specifically claimed. For example, in other embodiments, it is envisioned that the key may take the form of, for example, a spring plunger assembly positioned within one of the body member and the contact carrier for axially biasing into contact with a recess formed in the other of the body member and contact carrier.

Additionally, while the key 300 has been described and illustrated in connection with coupling the contact carrier 145 and the body member 150, it should be understood that one or more keys may be used to couple any components of the pin and sleeve device where proper keying is required.

As previously mentioned, during wiring, the electrical wire strands from the electrical conductor 15 (FIG. 2) must be connected to the electrical contacts 160. To accomplish this, the various electrical strands must be inserted through openings 200 formed in the pin and sleeve device 100 such as, for example, the body member 150. One common problem encountered with inserting the electrical strands thru the openings 200 formed in the body member 150 for engaging with and securing to the electrical contacts 160 is splaying of the individual strands upon insertion through the openings 200 and into the corresponding recesses 161 of the electrical contacts 160.

Figure 8:
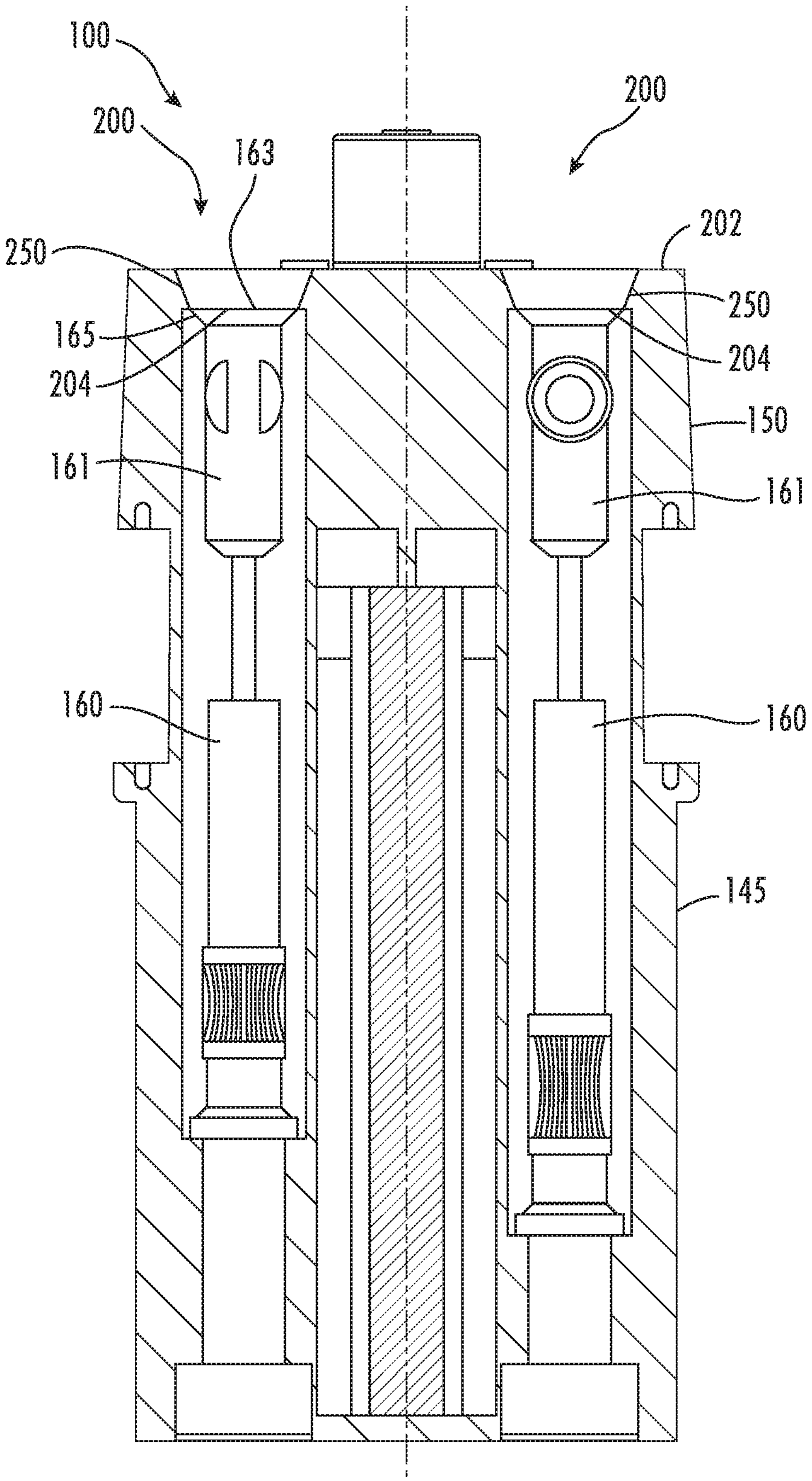
FIG. 8 is a cross-sectional view of an example embodiment of a pin and sleeve device in accordance with one aspect of the present disclosure, the pin and sleeve device including a contact carrier, a body member, and electrical contacts.
Figure 9:
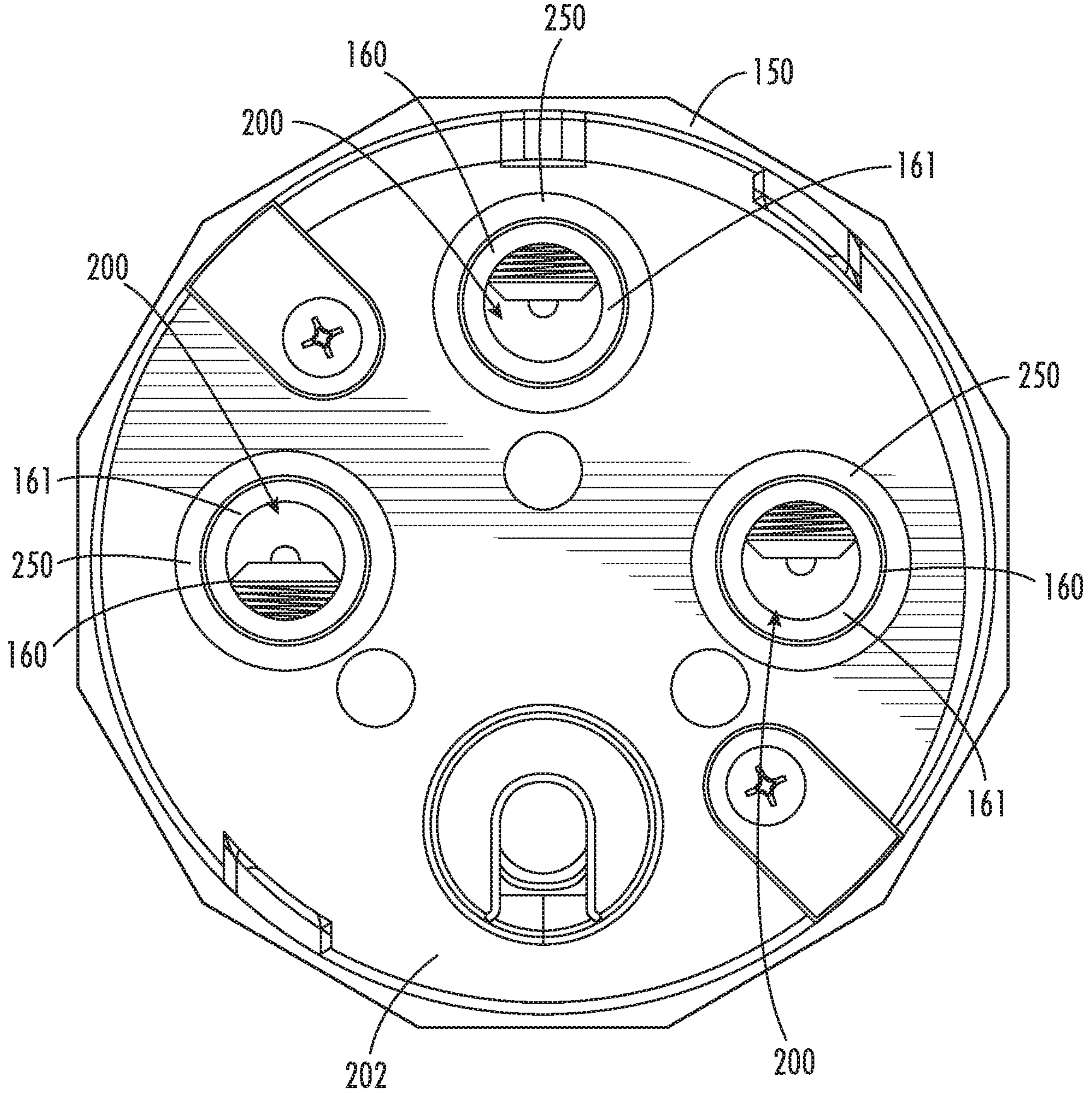
FIG. 9 is a top view of the pin and sleeve device shown in FIG. 8.

Referring to FIGS. 8 and 9, in accordance with one aspect of the present disclosure, in order to eliminate, or at least minimize, the splaying of individual wire strands upon insertion through the openings 200 and into the corresponding recesses 161 of the electrical contacts 160 and the subsequent required rework and potentially shorting between contacts 160, a funnel arrangement 250 may be incorporated into the pin and sleeve device 100 (e.g., body member 150 or other device component receiving the wire strands). That is, as illustrated, the holes 200 formed in the body member 150 (e.g., rear cap) may include a tapered surface or funnel shape extending from an exterior, top surface 202 of the body member 150 to an interior surface 204 thereof.

Moreover, as illustrated, in one example embodiment, the interior dimension or diameter of the tapered or funneled hole 200 substantially matches or corresponds to the diameter of the recess 161 formed in the electrical contact 160 so that a smooth interface between the hole 200 formed in the body member 150 and the recess 161 formed in the contact 160 is achieved to prevent wire splay when transitioning from the hole 200 into the recess 161. That is, each of the funnel shaped openings 250 include a diameter or dimension (used interchangeably herein without the intent to limit) at the interior surface 204. Additionally, each of the electrical contacts 160 includes a recess 161 having a diameter or dimension, the dimension of the openings 250 at the interior surface 204 corresponding to the diameter of the recess 161 formed in the electrical contact 160. In addition, the recess 161 formed in the electrical contact 160 may also include a funnel or tapered shaped opening 165 formed therein. In use, the funnel shaped opening 165 formed in the contacts 160 is arranged and configured to correspond with the funnel shaped opening 250 formed in the body member 150 so that a single continuous smooth transition is formed in the body member 150 and the contacts 160. As illustrated, the funnel shaped opening 165 formed in the contacts 160 may extend from a top edge 163 of the contacts 160 towards the recess 161 formed in the electrical contacts 160.

In this manner, the smooth transition guides the individual strands of the electrical conductor 15 (FIG. 2) into the recess 161 formed in the electrical contacts 160 and prevents any resulting wire splay when transitioning from the hole 200 to the recess 161 thereby facilitating easier assembly.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word “a” or “an” should be understood as not excluding plural elements or steps, unless such exclusion is explicitly recited. Furthermore, references to “one embodiment” of the present disclosure are not intended to be interpreted as excluding the existence of additional embodiments that also incorporate the recited features.

The phrases “at least one”, “one or more”, and “and/or”, as used herein, are open-ended expressions that are both conjunctive and disjunctive in operation. The terms “a” (or “an”), “one or more” and “at least one” can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader’s understanding of the present disclosure, and do not create limitations, particularly as to the position, orientation, or use of this disclosure. Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. All rotational references describe relative movement between the various elements. Identification references (e.g., primary, secondary, first, second, third, fourth, etc.) are not intended to connote importance or priority but are used to distinguish one feature from another. The drawings are for purposes of illustration only and the dimensions, positions, order and relative to sizes reflected in the drawings attached hereto may vary.

What is claimed is:

1. An electrical pin and sleeve device comprising:
an outer housing;
a contact carrier positioned at least partially within the outer housing, the contact carrier including a plurality of holes;
a body member positioned at least partially within the outer housing and coupled to the contact carrier;
a plurality of electrical contacts including a ground contact and at least one phase contact, each of the plurality of electrical contacts being positioned within a respective one of the plurality of holes in the contact carrier;
wherein each of the ground contact and the at least one phase contact includes a unique key that is different from the key of the other contacts; and
wherein the plurality of holes each include a complementary unique key configured to receive a respective one of the plurality of electrical contacts so that during assembly, the unique keys on the contacts and the corresponding complementary unique key in the holes ensure that the ground contact and the at least one phase contact are insertable only into the respective hole.

2. The electrical pin and sleeve device of claim 1, wherein each of the keys include one or more chamfer surfaces.

3. The electrical pin and sleeve device of claim 1, wherein the plurality of electrical contacts each include a first portion having a first cross-sectional area and a second portion having a second cross-sectional area, the first cross-sectional area being different that the second cross-sectional area.

4. The electrical pin and sleeve device of claim 1, wherein each of the unique keys of the ground contact and the at least one phase contact and each of the complementary unique keys formed in the plurality of holes are selected from one or more of a chamfer surface, a different size, a different shape, or one or more corresponding projections and recesses formed in the plurality of contacts and the plurality of holes in the contact carrier, respectively.

5. The electrical pin and sleeve device of claim 1, wherein the contact carrier further comprises an additional key adapted and configured to engage an additional key formed on the body member, the additional key being adapted and configured to prevent the body member from moving relative to the contact carrier after the body member has been coupled to the contact carrier.

6. The electrical pin and sleeve device of claim 5, wherein the additional key include one of a projection or a recess on the contact carrier for engaging with the other one of a projection or recess formed on the body member.

7. The electrical pin and sleeve device of claim 1, wherein the body member includes a plurality of holes, each of the plurality of holes being sized and configured to receive wire strands from an electrical conductor to be connected to a respective contact of the plurality of electrical contacts, the plurality of holes formed in the body member including a funnel shaped opening arranged and configured to prevent splaying of the wire strands of the electrical conductor during insertion.

8. The electrical pin and sleeve device of claim 7, wherein the funnel shaped opening extends from an exterior surface of the body member to an interior surface thereof.

9. The electrical pin and sleeve device of claim 8, wherein each of the funnel shaped openings include a dimension at the interior surface thereof, each of the plurality of electrical contacts includes a recess having a diameter at a top edge thereof, the dimension of the funnel shaped openings at the interior surface thereof corresponding to the diameter of the recess formed in the electrical contact at the top edge thereof.

10. The electrical pin and sleeve device of claim 9, wherein the recess formed in the electrical contact includes a funnel shaped recess portion extending from the top edge thereof, the funnel shaped opening formed in the contacts is arranged and configured to correspond with the funnel shaped opening formed in the body member so that a single continuous smooth transition is formed in the body member and the plurality of electrical contacts.

11. An electrical pin and sleeve device comprising:
an outer housing;
a contact carrier positioned at least partially within the outer housing, the contact carrier including a plurality of holes;
a body member positioned at least partially within the outer housing and coupled to the contact carrier; and
a plurality of electrical contacts including a ground contact, and at least one phase contact, each of the plurality of electrical contacts being positioned within a respective one of the plurality of holes in the contact carrier;
wherein:
the ground contact includes a first key, and the at least one phase contact includes a second key;
the hole for the ground contact includes a third key, and the hole for the at least one phase contact includes a fourth key;
the first key corresponding to the third key so that the ground contact can only be inserted into the hole for the ground contact;
and
the second key corresponding to the fourth key so that the at least one phase contact can only be inserted into the hole for the phase contact.

12. The electrical pin and sleeve device of claim 11, wherein one of the first or second keys is a first chamfer surface, and the other one of the first or second keys is a first and second chamfer surface, and
wherein the plurality of holes in the contact carrier comprise third and fourth chamfer surfaces formed in the contact carrier corresponding to the first and second keys, respectively.

13. An electrical pin and sleeve device comprising:
an outer housing;
a contact carrier positioned at least partially within the outer housing, the contact carrier including a plurality of holes;
a body member positioned at least partially within the outer housing and coupled to the contact carrier; and
a plurality of electrical contacts including a ground contact and at least one phase contact, each of the plurality of contacts being positioned within a respective one of the plurality of holes in the contact carrier;
wherein the contact carrier includes a key adapted and configured to engage a key formed on the body member, the key formed on the contact carrier and the key formed on the body member being adapted and configured to prevent the body member from moving relative to the contact carrier after the body member has been coupled to the contact carrier; and
wherein each of the ground contact and the at least one phase contact includes an additional unique key, each of the additional unique keys being adapted and configured to ensure that the ground contact and the at least one phase contact are insertable only into a corresponding hole in the contact carrier.

14. The electrical pin and sleeve device of claim 13, wherein the key formed on the contact carrier includes one of a projection or a recess for engaging with recess or projection, respectively, formed on the body member.

15. The electrical pin and sleeve device of claim 13, wherein each of the additional unique keys include one or more chamfer surfaces.

16. The electrical pin and sleeve device of claim 13, wherein the plurality of holes each include a complementary key adapted and configured to ensure that the ground contact is only insertable into the hole for receiving the ground contact, and the at least one phase contact is only insertable into the hole for receiving the at least one phase contact.

17. The electrical pin and sleeve device of claim 13, wherein:

the ground contact includes a first contact key, and the at least one phase contact includes a second contact key;

the hole for the ground contact includes a third contact key, and the hole for the at least one phase contact includes a fourth contact key;

the first contact key corresponding to the third contact key; and the second contact key corresponding to the fourth contact key.

18. The electrical pin and sleeve device of claim 17, wherein one of the first or second contact keys is a first chamfer surface, and the other one of the first or second contact keys is a first and second chamfer surface, the third and fourth contact keys formed in the contact carrier corresponding to the first and second contact keys, respectively.

19. The electrical pin and sleeve device of claim 17, wherein the first and second contact keys are selected from one of a chamfer surface, a different size, a different shape, or one or more corresponding projections and recesses.

20. An electrical pin and sleeve device comprising:

an outer housing;

a contact carrier positioned within the outer housing, the contact carrier including a plurality of holes;

a body member positioned within the outer housing and coupled to the contact carrier; and a plurality of electrical contacts including a ground contact and at least one phase contact, each of the plurality of electrical contacts being positioned within a respective one of the plurality of holes in the contact carrier;

wherein the body member includes a plurality of holes adapted and configured to enable electrical strands from an electrical conductor to be connected to the plurality of electrical contacts, the plurality of holes formed in the body member including a funnel shaped opening adapted and configured to prevent splaying of the electrical strands during insertion;

wherein the funnel shaped opening extends from an exterior surface of the body member to an interior surface thereof; and wherein each of the funnel shaped openings include a dimension at the interior surface thereof, each of the plurality of electrical contacts includes a recess having a diameter at a top edge thereof, the dimension of the funnel shaped openings at the interior surface thereof corresponding to the diameter of the recess formed in the electrical contact at the top edge thereof.

21. The electrical pin and sleeve device of claim 20, wherein the recess formed in the electrical contact includes a funnel shaped recess portion extending from the top edge thereof, the funnel shaped opening formed in the plurality of electrical contacts is arranged and configured to correspond with the funnel shaped opening formed in the body member so that a single continuous smooth transition is formed in the body member and the plurality of electrical contacts.

* * * * *